US012785196B2

(12) United States Patent
Xu et al.

(10) Patent No.: US 12,785,196 B2
(45) Date of Patent: Nov. 3, 2026

(54) BATTERY, POWER CONSUMPTION APPARATUS, AND METHOD AND APPARATUS FOR PRODUCING BATTERY

(71) Applicant: CONTEMPORARY AMPEREX TECHNOLOGY (HONG KONG) LIMITED, Hong Kong (CN)

(72) Inventors: Xiao Xu, Ningde (CN); Xiping Liao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 688 days.

(21) Appl. No.: 17/897,364

(22) Filed: Aug. 29, 2022

(65) Prior Publication Data

US 2023/0089208 A1 Mar. 23, 2023

Related U.S. Application Data

(63) Continuation of application No. PCT/CN2021/119742, filed on Sep. 23, 2021.

(51) Int. Cl.

*H01M 50/262* (2021.01)
*B60K 1/04* (2019.01)

(Continued)

(52) U.S. Cl.

CPC ............. *H01M 50/262* (2021.01); *B60K 1/04* (2013.01); *H01M 10/613* (2015.04); (Continued)

(58) Field of Classification Search

None

See application file for complete search history.

(56) References Cited

U.S. PATENT DOCUMENTS

2003/0003350 A1* 1/2003 Heimer ............... H01M 50/253 429/97
2011/0165451 A1* 7/2011 Kim ...................... H01M 50/20 429/153

(Continued)

FOREIGN PATENT DOCUMENTS

CN 102810654 A 12/2012
CN 107946503 A 4/2018

(Continued)

OTHER PUBLICATIONS

Machine English translation of CN209183608U originally published to Tang Jul. 30, 2019 (Year: 2019).*

(Continued)

*Primary Examiner* — Ula C Ruddock
*Assistant Examiner* — Mary Grace Harris
(74) *Attorney, Agent, or Firm* — ANOVA LAW GROUP, PLLC

(57) ABSTRACT

A battery includes a battery cell and a box. A surface of the battery cell is provided with an electrode terminal. A portion of the box forms an accommodating chamber having an opening. The battery cell is accommodated in the accommodating chamber. The surface of the battery cell is configured to be fixedly connected to a cover covering the opening to fixedly connect the battery cell to the cover.

14 Claims, 8 Drawing Sheets

(51) Int. Cl.

| | |
|---|---|
| ***H01M 10/613*** | (2014.01) |
| ***H01M 10/625*** | (2014.01) |
| ***H01M 10/647*** | (2014.01) |
| ***H01M 10/6556*** | (2014.01) |
| ***H01M 10/658*** | (2014.01) |
| ***H01M 50/103*** | (2021.01) |
| ***H01M 50/209*** | (2021.01) |
| ***H01M 50/24*** | (2021.01) |
| ***H01M 50/242*** | (2021.01) |
| ***H01M 50/249*** | (2021.01) |
| ***H01M 50/271*** | (2021.01) |
| ***H01M 50/289*** | (2021.01) |
| ***H01M 50/291*** | (2021.01) |
| ***H01M 50/342*** | (2021.01) |
| ***H01M 50/588*** | (2021.01) |
| ***H01M 50/593*** | (2021.01) |

(52) U.S. Cl.

CPC ....... *H01M 10/625* (2015.04); *H01M 10/647* (2015.04); *H01M 10/6556* (2015.04); *H01M 10/658* (2015.04); *H01M 50/103* (2021.01); *H01M 50/209* (2021.01); *H01M 50/24* (2021.01); *H01M 50/242* (2021.01); *H01M 50/249* (2021.01); *H01M 50/271* (2021.01); *H01M 50/289* (2021.01); *H01M 50/291* (2021.01); *H01M 50/3425* (2021.01); *H01M 50/588* (2021.01); *H01M 50/593* (2021.01); *B60K 2001/0438* (2013.01); *H01M 2220/20* (2013.01)

(56) References Cited

U.S. PATENT DOCUMENTS

| | | | | |
|---|---|---|---|---|
| 2011/0281152 | A1* | 11/2011 | He | H01M 4/742 429/159 |
| 2012/0164490 | A1* | 6/2012 | Itoi | H01M 50/358 429/82 |
| 2012/0308873 | A1 | 12/2012 | Sekino et al. | |
| 2012/0310566 | A1 | 12/2012 | Hoshino et al. | |
| 2017/0358831 | A1* | 12/2017 | Milroy | H01M 10/6552 |
| 2018/0351219 | A1* | 12/2018 | Smith | H01M 50/30 |
| 2020/0212388 | A1 | 7/2020 | Chen et al. | |
| 2021/0013478 | A1* | 1/2021 | Sasaki | H01G 11/82 |
| 2021/0091437 | A1 | 3/2021 | Chen et al. | |
| 2022/0158290 | A1* | 5/2022 | Choi | H01M 50/224 |
| 2024/0010101 | A1* | 1/2024 | Arratibel Urdampilleta | B60L 50/64 |
| 2024/0123811 | A1* | 4/2024 | Yi | H01M 50/20 |

FOREIGN PATENT DOCUMENTS

| | | | |
|---|---|---|---|
| CN | 209183608 | U | 7/2019 |
| CN | 209249528 | U | 8/2019 |
| CN | 111900302 | A | 11/2020 |
| CN | 112018300 | A | 12/2020 |
| CN | 112117400 | A | 12/2020 |
| CN | 112310525 | A | 2/2021 |
| CN | 112498497 | A | 3/2021 |
| CN | 213026305 | U | 4/2021 |
| CN | 213026309 | U | 4/2021 |
| CN | 213782158 | U | 7/2021 |
| EP | 2530763 | A1 | 12/2012 |
| JP | 2013251241 | A | 12/2013 |

OTHER PUBLICATIONS

The World Intellectual Property Organization (WIPO) International Search Report and Written Opinion for PCT/CN2021/119742 Apr. 26, 2022 17 pages (including translation).
The European Patent Office (EPO) The Extended European Search Report for 21926070.0 Oct. 13, 2023 10 Pages.
The State Intellectual Property Office of the People's Republic of China The First Office Action for Application No. 202180081564.0 May 18, 2026 30 Pages (including translation).

* cited by examiner

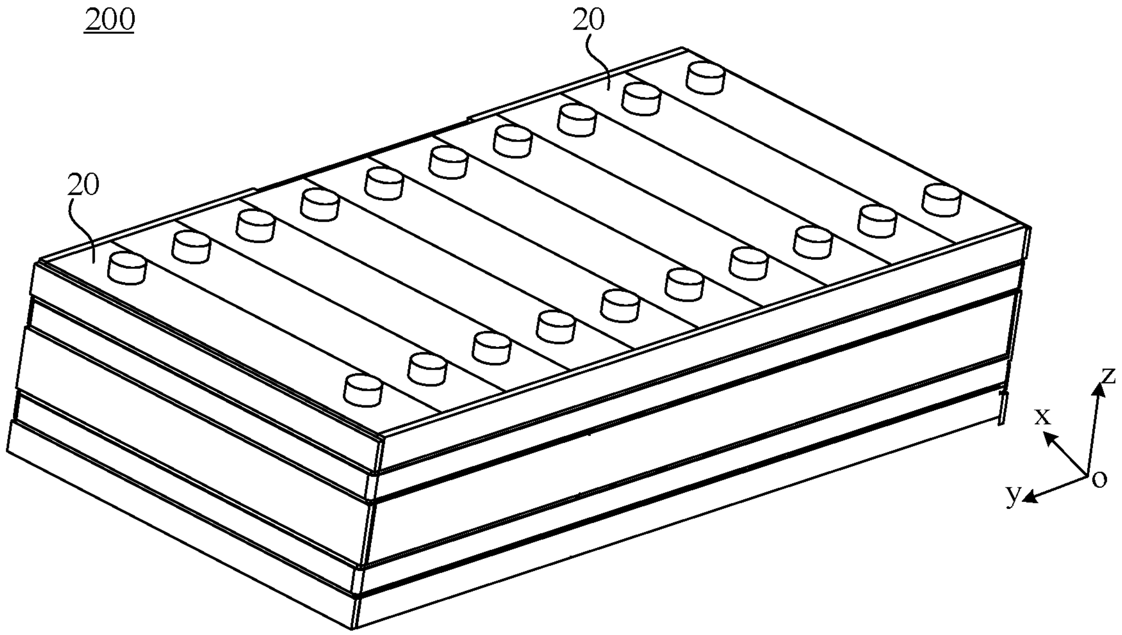
FIG. 3
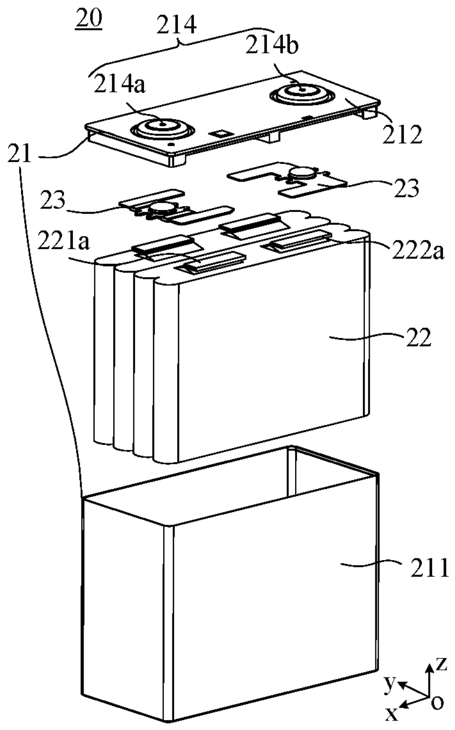
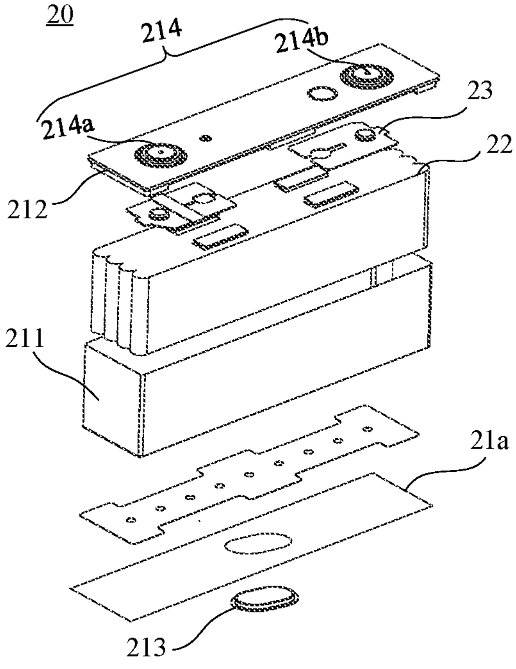
FIG. 4 FIG. 5

BATTERY, POWER CONSUMPTION APPARATUS, AND METHOD AND APPARATUS FOR PRODUCING BATTERY

CROSS-REFERENCE TO RELATED APPLICATION

This application is a continuation of International Application No. PCT/CN2021/119742, filed on Sep. 23, 2021, the entire content of which is incorporated herein by reference.

TECHNICAL FIELD

The present application relates to the field of battery technologies, and in particular, to a battery, a power consumption apparatus, and a method and apparatus for producing a battery.

BACKGROUND

Energy conservation and emission reduction are the key to the sustainable development of the automotive industry. In this case, electric vehicles have become an important part of the sustainable development of the automotive industry due to their advantages of energy conservation and environmental protection. For the electric vehicles, the battery technology is an important factor for their development.

Volumetric energy density of a battery is an important parameter that affects a battery life of a power consumption apparatus, such as an electric vehicle. With the same battery volume, the higher the volumetric energy density, the more battery cells can be accommodated, and the longer the battery life of the electric vehicle. In a current battery design, there are still many structural members, for example, box beams such as cross beams and longitudinal beams. The existence of these structural members reduces the volumetric energy density of the battery and affects the battery life of the power consumption apparatus. Therefore, how to increase volumetric energy density of a battery is an urgent technical problem to be solved in the battery technology.

SUMMARY

The present application provides a battery, a power consumption apparatus, a method and apparatus for producing a battery, which could reduce the use of structural members in the battery and increase volumetric energy density of the battery.

In a first aspect, a battery is provided, including: a plurality of battery cells, a first surface of each battery cell of the plurality of battery cells being provided with an electrode terminal; and a box, the box including: a first portion, the first portion forming an accommodating chamber having an opening; where the plurality of battery cells are accommodated in the accommodating chamber, and the first surface is configured to be fixedly connected to a cover covering the opening to fixedly connect the plurality of battery cells to the cover.

In an embodiment of the present application, by fixing a surface of a battery cell provided with an electrode terminal to a cover, the use of structural members, such as box beams, can be reduced or avoided, a structure of a battery is simplified, and more battery cells can be accommodated in the battery, thereby increasing volumetric energy density of the battery.

In some embodiments, the cover is located above the first portion after the box is mounted to a vehicle.

The cover is located above the first portion, that is, the plurality of battery cells are located in a direction of gravity of the cover. Since the plurality of battery cells are fixed to the cover, the cover may be used as a main load-bearing structure. In this way, the overall structural strength of the battery can be improved, and stability of the battery cells in the box can be improved.

In some embodiments, the cover is a floor of the vehicle.

In an embodiment of the present application, a floor of the vehicle can be directly used as the cover fixing the battery cells. The plurality of battery cells are fixed to the floor of the vehicle as the cover due to high strength and rigidity of the floor of the vehicle, which can improve the overall rigidity and structural strength of the battery and further realize the integration of the battery with the vehicle. Further, the battery cells are fixed to the floor of the vehicle, which can avoid or reduce the use of box beams and simplify the structure of the battery, thereby increasing the volumetric energy density of the battery.

In some embodiments, the cover is a second portion of the box, and the second portion is fastened to the first portion to cover the opening.

In an embodiment of the present application, the cover may be a portion of the floor of the vehicle, or the cover may be a portion independent of the floor of the vehicle, that is, a second portion. In this case, the first portion and the second portion are fastened to each other to form the accommodating chamber accommodating the battery cells. Then, the box consisting of the first portion and the second portion may be mounted to a power consumption apparatus for use, such as a vehicle, and the structure of this box independent of the vehicle can flexibly adapt to needs of different situations.

In some embodiments, a connecting region between the first surface and the cover is provided with a first insulating layer, and the first insulating layer is configured to separate the first surface from the cover.

In an embodiment of the present application, an insulating layer may be disposed on the first surface of the battery cell provided with the electrode terminal, thereby separating the battery cell from the cover, ensuring the safe use of the battery, and enhancing safety of the battery.

In some embodiments, the first insulating layer and the first surface are an integral structure; or the first insulating layer is an insulating sheet fixed to the first surface.

By selecting different implementation manners of the first insulating layer, the production process of the battery can be flexibly adjusted to adapt to different needs.

In some embodiments, a gap is provided between the electrode terminal and the cover after the first surface is fixed to the cover.

By reserving a gap between the electrode terminal and the cover, the separation between the electrode terminal and the cover can be maintained to realize mutual insulation, which ensures the safe use of the battery and enhances the safety of the battery.

In some embodiments, the battery further includes: a bus component configured to be electrically connected to the electrode terminal, a second insulating layer being disposed on the bus component, and the second insulating layer being configured to separate the electrode terminal from the cover.

By disposing a second insulating layer on a bus component, the electrode terminal is insulated and separated from the cover, thereby ensuring the safe use of the battery and enhancing the safety of the battery.

In some embodiments, the battery cell includes a pressure relief mechanism, the pressure relief mechanism is disposed on a second surface of the battery cell opposite to the first surface, and the pressure relief mechanism is configured to be actuated when an internal pressure or temperature of the battery cell provided with the pressure relief mechanism reaches a threshold, to relieve the internal pressure.

By disposing a pressure relief mechanism on a surface without the electrode terminal, temperature or pressure released during thermal runaway of the battery cell may not affect the electrode terminal, such as occurrence of short circuit, which enhances the safety of the battery. Meanwhile, the pressure relief mechanism in the embodiments of the present application is disposed at a position close to the first portion of the box, and after the battery is normally mounted to a power consumption apparatus, the pressure relief mechanism is located at the bottom of the battery. In this way, the discharge direction of the emissions released during the thermal runaway of the battery cell is toward the bottom of the vehicle, which does not cause harm to the vehicle or passengers.

In some embodiments, the battery further includes: a thermal management component, the thermal management component being configured to accommodate a fluid to adjust a temperature of the plurality of battery cells, the thermal management component being attached to the second surface, a predetermined gap being provided between the thermal management component and a bottom wall of the accommodating chamber, a pressure relief region corresponding to the pressure relief mechanism being disposed on the thermal management component, and the pressure relief region being configured for emissions to pass when the pressure relief mechanism is actuated.

In an embodiment of the present application, by disposing a thermal management component directly under the battery cells, heat exchange efficiency between the thermal management component and the battery cells can be improved, and the temperature adjustment effect on the battery cells can be improved. Meanwhile, a predetermined gap is provided with the thermal management component and a bottom wall of the first portion. In this way, after the thermal runaway of the battery cell, the emissions may enter the gap after passing through a pressure relief region. Since the gap is air, the emissions can be cooled to a certain extent, which reduces the risk of the emissions and enhances the safety of the battery.

In some embodiments, the battery further includes: a bottom protective structure, the bottom protective structure being disposed opposite to the pressure relief mechanism, and the bottom protective structure being attached to a surface of the thermal management component away from the plurality of battery cells.

By disposing a bottom protective structure corresponding to the pressure relief mechanism under the thermal management component, the pressure relief mechanism can be prevented from being damaged when the battery is invaded by foreign matters, thereby ensuring the normal use of the battery cells and enhancing the safety of the battery.

In some embodiments, the bottom protective structure includes: an avoidance portion and a cushioning portion, the cushioning portion being disposed under the avoidance portion, where the avoidance portion is configured to provide a relief space for the pressure relief mechanism, and the cushioning portion is configured to protect the pressure relief mechanism.

By providing an avoidance portion and a cushioning portion, on the one hand, the normal actuation of the pressure relief mechanism can be ensured; and on the other hand, the damage caused by the foreign matters can be cushioned using the cushioning portion, which ensures the normal use of the pressure relief mechanism and enhancing the safety of the battery.

In some embodiments, the plurality of battery cells form a plurality of battery cell groups, each battery cell group includes a plurality of battery cells arranged along a first direction, the plurality of battery cell groups are arranged along a second direction, and the second direction is perpendicular to the first direction, where a spacer plate is provided between the plurality of battery cell groups.

By providing a spacer plate between a plurality of battery cell groups, the plurality of battery cell groups can be separated from each other, which improves the overall rigidity and structural strength of the battery.

In some embodiments, the spacer plate includes a first sub-plate and a second sub-plate, and the first sub-plate and the second sub-plate form a T-shaped structure.

By providing a T-shaped spacer plate, on the one hand, the separation between the battery cell groups can be realized using a second sub-plate, which improves the overall rigidity and structural strength of the battery; and on the other hand, two adjacent battery cell groups can be completely insulated and separated from each other using a first sub-plate, which ensures the normal use of the battery and enhances the safety of the battery.

In some embodiments, the battery further includes: an insulating sheet, the insulating sheet being disposed at both ends of the each battery cell group along the first direction; and/or a cushion, the cushion being disposed at both ends of the each battery cell group along the first direction.

By providing an insulating sheet, the insulation between the box of the battery and the battery cells can be realized; and by providing a cushion, it is helpful to release expansion and deformation of the battery cells caused after multiple cycles of operation, which enhances the safety of the battery.

In some embodiments, the battery further includes: two end plates, the two end plates being respectively disposed at both ends of the plurality of battery cell groups along the first direction, and two side plates, the two side plates being respectively disposed at both ends of the plurality of battery cell groups along the second direction, where the two end plates and the two side plates are fixedly connected to each other.

End plates and side plates that are fixedly connected to each other can fix the battery cells in the box, which improves the overall rigidity and structural strength of the battery, and can resist the expansion of the battery cells caused after multiple cycles and enhance the safety of the battery.

In some embodiments, the first surface is adhesively fixed to the cover to fixedly connect the plurality of battery cells to the cover.

The first surface is fixed to the cover by means of adhesion. On the one hand, the use of structural members, such as box beams, can be reduced or avoided, and the volumetric energy density of the battery can be improved; and on the other hand, assembly complexity can be simplified, and the production efficiency of the battery can be improved.

In a second aspect, a power consumption apparatus is provided, including: the battery according to the first aspect, the battery being configured to supply electric energy.

In some embodiments, the power consumption apparatus is a vehicle, a ship or a spacecraft.

In a third aspect, a method for producing a battery is provided, including: providing a plurality of battery cells, a first surface of each battery cell of the plurality of battery cells being provided with an electrode terminal; and providing a box, the box including: a first portion, the first portion forming an accommodating chamber having an opening; where the plurality of battery cells are accommodated in the accommodating chamber, and the first surface is configured to be fixedly connected to a cover covering the opening to fixedly connect the plurality of battery cells to the cover.

In a fourth aspect, an apparatus for producing a battery is provided, including: a first providing module configured to provide a plurality of battery cells, a first surface of each battery cell of the plurality of battery cells being provided with an electrode terminal; and a second providing module configured to provide a box, the box including: a first portion, the first portion forming an accommodating chamber having an opening; where the plurality of battery cells are accommodated in the accommodating chamber, and the first surface is configured to be fixedly connected to a cover covering the opening to fixedly connect the plurality of battery cells to the cover.

BRIEF DESCRIPTION OF DRAWINGS

In order to illustrate technical solutions in embodiments of the present application more clearly, brief description will be made below to accompanying drawings required in the embodiments of the present application. Apparently, the accompanying drawings described below are some embodiments of the present application only, and other drawings could be obtained based on these accompanying drawings by those ordinary skilled in this art without creative efforts.

FIG. 3 is a schematic structural diagram of a battery cell group disclosed in an embodiment of the present application;

FIG. 4 is an exploded view of a battery cell disclosed in an embodiment of the present application;

FIG. 5 is an exploded view of a battery cell disclosed in another embodiment of the present application;

Figure 1:
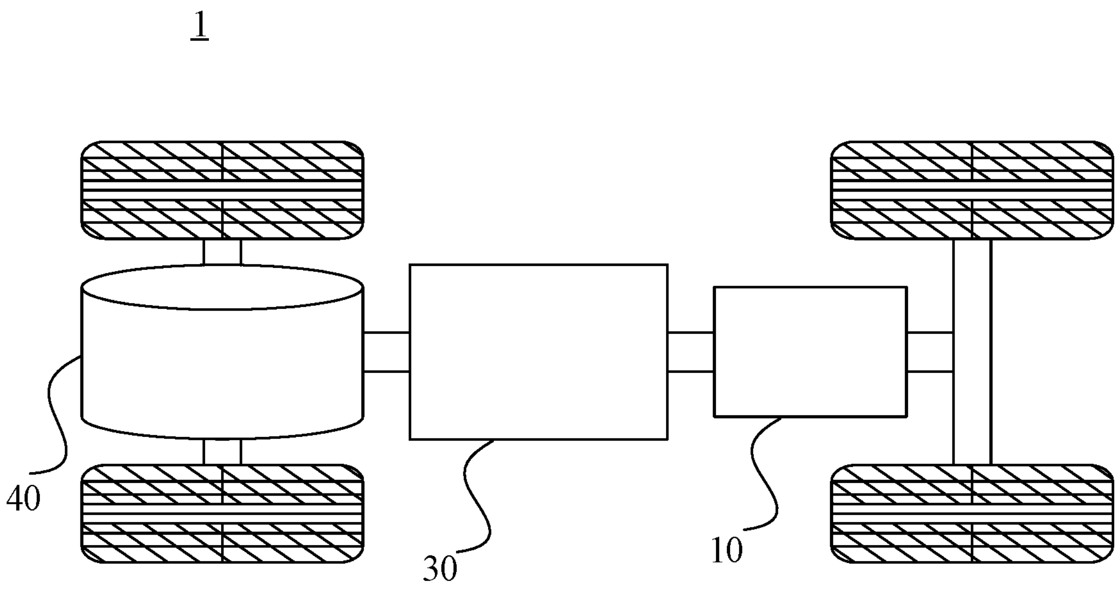
FIG. 1 is a schematic structural diagram of a vehicle disclosed in an embodiment of present application.

In the accompanying drawings, the accompanying drawings are not drawn to actual scale.

DESCRIPTION OF EMBODIMENTS

Implementation manners of the present application will be further described below in detail with reference to drawings and embodiments. The detailed description of the following embodiments and the accompanying drawings are used to exemplarily illustrate principles of the present application, but cannot be used to limit the scope of the present application, that is, the present application is not limited to the described embodiments.

In the depiction of the present application, it should be noted that, unless otherwise illustrated, the meaning of "a plurality of" is two or more; and orientations or positional relationships indicated by terms such as "up", "down", "left", "right", "inside", and "outside" are merely for convenience of describing the present application and for simplifying the description, rather than for indicating or implying that an apparatus or element indicated must have a specific orientation, and must be constructed and operated in a specific orientation, which thus shall not be understood as limitation to the present application. In addition, the terms such as "first", "second", and "third" are merely intended for the purpose of description, and shall not be understood as an indication or implication of relative importance. "Vertical" is not strictly vertical, but within an allowable range of error. "Parallel" is not strictly parallel, but within an allowable range of error.

The terms representing orientations in the following description are all directions shown in the drawings, and do not limit the specific structure of the present application. In the description of the present application, it should be further noted that, unless otherwise explicitly specified and defined, terms "installation", "interconnection" and "connection" should be understood in a broad sense; for example, they may be either a fixed connection, or a detachable connection, or an integrated connection; and they may be either a direct connection, or an indirect connection through an intermediate medium. Those of ordinary skill in the art may appreciate the specific meanings of the foregoing terms in the present application according to specific conditions.

In the present application, a battery cell may include a primary battery, a secondary battery, such as a lithium-ion battery, a lithium-sulfur battery, a sodium/lithium-ion battery, a sodium-ion battery or a magnesium-ion battery, which is not limited in the embodiments of the present application. The battery cell may be cylindrical, flat, cuboid or in another shape, which is also not limited in the embodiments of the present application. A battery cell is generally divided into three types according to the way of packaging: a cylindrical battery cell, a prismatic battery cell and a pouch battery cell, which is also not limited in the embodiments of the present application.

The battery mentioned in the embodiments of the present application refers to a single physical module including one or more battery cells to provide a higher voltage and capacity. For example, the battery mentioned in the present application may include a battery cell group, a battery pack or the like. The battery pack generally includes a box for packaging one or more battery cells. The box can avoid liquid or other foreign matters to affect charging or discharging of the battery cell.

The battery cell includes an electrode assembly and an electrolytic solution, and the electrode assembly includes a positive electrode sheet, a negative electrode sheet and a separator. The operation of the battery cell mainly relies on movement of metal ions between the positive electrode sheet and the negative electrode sheet. The positive electrode sheet includes a positive electrode current collector and a positive active material layer. The positive active material layer is coated on a surface of the positive electrode current collector, the current collector not coated with the positive active material layer protrudes from the current collector coated with the positive active material layer, and the current collector not coated with the positive active material layer is used as a positive tab. In an example of a lithium-ion battery, the material of the positive electrode current collector may be aluminum, and the positive active material may be lithium cobalt oxides, lithium iron phosphate, ternary lithium, lithium manganate, or the like. The negative electrode sheet includes a negative electrode current collector and a negative active material layer. The negative active material layer is coated on a surface of the negative electrode current collector, the current collector not coated with the negative active material layer protrudes from the current collector coated with the negative active material layer, and the current collector not coated with the negative active material layer is used as a negative tab. The material of the negative electrode current collector may be copper, and the negative active material may be carbon, silicon, or the like. In order to ensure that no fusing occurs when a large current passes, there are a plurality of positive tabs which are stacked together, and there are a plurality of negative tabs which are stacked together. The material of the separator may be polypropylene (PP) or polyethylene (PE), or the like. In addition, the electrode assembly may be a winding structure or a laminated structure, and the embodiments of the present application are not limited thereto. With the development of the battery technology, it is necessary to consider design factors in multiple aspects simultaneously, such as energy density, cycle life, discharge capacity, C-rate and other performance parameters. In addition, safety of the battery should also be considered.

Volumetric energy density of a battery is an important parameter that affects a battery life of a power consumption apparatus, such as an electric vehicle. With the same battery volume, the higher the volumetric energy density, the more battery cells can be accommodated, and the longer the battery life of the electric vehicle. In a current battery design, battery cells are first assembled into a battery cell group, and then assembled into a battery. In the battery, there are generally both structural members of the battery cell group and structural members of the battery, which greatly reduces the overall volumetric energy density of the battery. In addition, in some battery designs, battery cells can be directly assembled into a battery, and structural members of a battery cell group are eliminated, which can improve the volumetric energy density of the battery to a certain extent. However, there are still structural members of the battery, for example, box beams such as cross beams and longitudinal beams, which does not maximize the increase of the volumetric energy density of the battery.

In view of this, an embodiment of the present application provides a technical solution. By fixing a surface of a battery cell provided with an electrode to a cover, the use of structural members, such as box beams, can be reduced or avoided, a structure of a battery is simplified, and more battery cells can be accommodated in the battery, thereby increasing volumetric energy density of the battery.

The technical solutions described in the embodiments of the present application are all applicable to various apparatuses using batteries, such as mobile phones, portable devices, notebook computers, electromobiles, electric toys, electric tools, electric vehicles, ships and spacecrafts. For example, the spacecrafts include airplanes, rockets, space shuttles, spaceships, and the like.

It should be understood that the technical solutions described in the embodiments of the present application are not only applicable to the devices described above, but also applicable to all devices using batteries. However, for brief description, the following embodiments are all described by an example of an electric vehicle.

For example, as shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. A motor 40, a controller 30 and a battery 10 may be disposed in an interior of the vehicle 1, and the controller 30 is configured to control the battery 10 to supply power to the motor 40. For example, the battery 10 may be disposed at the bottom, head or tail of the vehicle 1. The battery 10 may be configured to supply power to the vehicle 1. For example, the battery 10 may be used as an operation power source of the vehicle 1 for a circuit system of the vehicle 1, for example, for a working power demand of the vehicle 1 during startup, navigation and running. In another embodiment of the present application, the battery 10 may be used not only as an operation power source of the vehicle 1, but also as a driving power source of the vehicle 1, replacing or partially replacing fuel or natural gas to supply driving power for the vehicle 1.

In order to meet different power usage demands, the battery according to the present application may include a plurality of battery cells, where the plurality of battery cells may be in series connection, parallel connection or series-parallel connection. The series-parallel connection refers to a combination of series connection and parallel connection. The battery may also be referred to as a battery pack. Optionally, the plurality of battery cells may be first connected in series, in parallel or in series and parallel to constitute a battery module, and then a plurality of battery modules are connected in series, in parallel or in series and parallel to constitute a battery. That is, the plurality of battery cells may directly constitute a battery, or may first constitute a battery module, and then battery modules constitute a battery.

Figure 2:
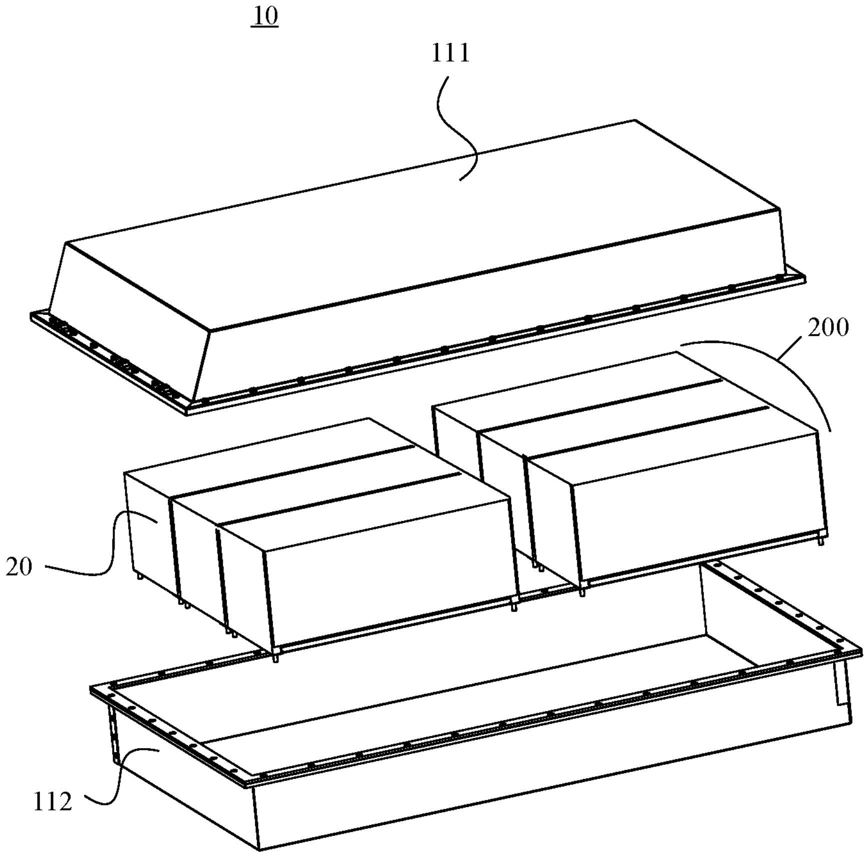
FIG. 2 is a schematic structural diagram of a battery disclosed in an embodiment of the present application.

For example, as shown in FIG. 2, FIG. 2 is a schematic structural diagram of a battery 10 according to an embodiment of the present application. The battery 10 may include a plurality of battery cells 20. The battery 10 may further include a box, an interior of the box is a hollow structure, and the plurality of battery cells 20 are accommodated in the box. As shown in FIG. 2, the box may include two portions, which are referred to as a first portion 111 of the box and a second portion 112 of the box, respectively, and the first portion 111 and the second portion 112 of the box are fastened together. Shapes of the first portion 111 and the second portion 112 of the box may be determined according to a shape of a combination of the battery cells 20, and the first portion 111 and the second portion 112 of the box may each have an opening. For example, the first portion 111 and the second portion 112 of the box each may be a hollow cuboid and each have only one surface as a surface with an opening, the opening of the first portion 111 of the box is disposed opposite to the opening of the second portion 112 of the box, and the first portion 111 and the second portion 112 of the box are fastened to each other to form a box with a closed chamber. The plurality of battery cells 20 are combined in parallel connection or series connection or series-parallel connection and then placed in the box formed after the first portion 111 and the second portion 112 of the box are fastened.

Optionally, the battery 10 may further include another structure, which will not be repeated redundantly herein. For example, the battery 10 may further include a bus component, and the bus component is configured to implement electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 may be further led out through an electrically conductive mechanism to pass through the box.

According to different power demands, the number of battery cells may be set to any value. The plurality of battery cells may be connected in series, in parallel or in series and parallel to implement a larger capacity or power. Since there may be many battery cells included in each battery 10, the battery cells may be arranged in groups for convenience of installation, and each group of battery cells constitutes a battery cell group 200. The number of battery cells included in the battery cell group 200 is not limited and may be set according to needs. For example, FIG. 3 is an example of the battery cell group. The battery may include a plurality of battery cell groups, and these battery cell groups may be connected in series, in parallel or in series and parallel.

As shown in FIG. 4, FIG. 4 is a schematic structural diagram of a battery cell 20 according to an embodiment of the present application. The battery cell 20 includes one or more electrode assemblies 22, a housing 211 and a cover plate 212. The housing 211 and the cover plate 212 form a shell 21. A wall of the housing 211 and the cover plate 212 are each referred to as a wall of the battery cell 20. The housing 211 is shaped according to a shape of the one or more electrode assemblies 22 after combination. For example, the housing 211 may be a hollow cuboid or cube or cylinder, and one face of the housing 211 has an opening, so that the one or more electrode assemblies 22 may be placed in the housing 211. For example, when the housing 211 is a hollow cuboid or cube, one plane of the housing 211 is a surface with an opening, that is, the plane does not have a wall, so that the inside and outside of the housing 211 are in communication with each other. When the housing 211 may be a hollow cylinder, an end face of the housing 211 is a surface with an opening, that is, the end face does not have a wall, so that the inside and outside of the housing 211 are in communication with each other. The cover plate 212 covers the opening and is connected to the housing 211 to form a closed cavity in which the electrode assemblies 22 are placed. The housing 211 is filled with an electrolyte, such as an electrolytic solution.

The battery cell 20 may further include two electrode terminals 214, and the two electrode terminals 214 may be disposed on the cover plate 212. The cover plate 212 is generally in a shape of a flat plate, and the two electrode terminals 214 are fixed on a flat plate face of the cover plate 212. The two electrode terminals 214 are a positive electrode terminal **214*a* and a negative electrode terminal 214*b*, respectively. Each electrode terminal 214 is correspondingly provided with a connecting member 23, which is located between the cover plate 212 and the electrode assembly 22 and configured to electrically connect the electrode assembly 22 to the electrode terminal 214**.

As shown in FIG. 4, each electrode assembly 22 has a first tab **221*a* and a second tab 222*a*. The first tab 221*a* and the second tab 222*a* have opposite polarities. For example, when the first tab 221*a* is a positive tab, the second tab 222*a* is a negative tab. First tabs 221*a* of the one or more electrode assemblies 22 are connected to one electrode terminal through one connecting member 23, and second tabs 222*a* of the one or more electrode assemblies 22 are connected to the other electrode terminal through the other connecting member 23. For example, the positive electrode terminal 214*a* is connected to the positive tab through one connecting member 23, and the negative electrode terminal 214*b* is connected to the negative tab through the other connecting member 23**.

In this battery cell 20, according to actual usage demands, one or more electrode assemblies 22 may be provided. As shown in FIG. 4, four independent electrode assemblies 22 are disposed in the battery cell 20.

As shown in FIG. 5, FIG. 5 is a schematic structural diagram of a battery cell 20 including a pressure relief mechanism 213 according to another embodiment of the present application.

The housing 211, the cover plate 212, the electrode assembly 22 and the connecting member 23 in FIG. 5 are consistent with the housing 211, the cover plate 212, the electrode assembly 22 and the connecting member 23 in FIG. 4, which will not be repeated redundantly here for brevity.

In FIG. 5, the pressure relief mechanism 213 is disposed on a bottom wall of the battery cell 20, that is, a wall **21*a* shown in FIG. 5, where the pressure relief mechanism 213 may be a portion of the wall 21*a*, or may be a separate structure from the wall 21*a*, and is fixed to the wall 21*a* by means of welding, for example. When the pressure relief mechanism 213 is a portion of the wall 21*a*, for example, the pressure relief mechanism 213 may be formed by providing an indentation on the wall 21*a*, a thickness of the wall 21*a* corresponding to the indentation is smaller than that of another region of the pressure relief mechanism 213 other than the indentation. The indentation is the weakest position of the pressure relief mechanism 213. When excessive gas generated by the battery cell 20 causes an internal pressure of the housing 211 to rise and reach a threshold, or heat generated by an internal reaction of the battery cell 20 causes an internal temperature of the battery cell 20 to rise and reach a threshold, the pressure relief mechanism 213 may be fractured at the indentation, resulting in the communication between the inside and outside of the housing 211. The gas pressure and temperature are released outward through the cracking of the pressure relief mechanism 213, thereby avoiding explosion of the battery cell 20**.

In FIG. 5, the description is made by an example that the pressure relief mechanism 213 is located on the bottom wall of the battery cell 20, but it should be understood that the pressure relief mechanism 213 in the embodiments of the present application may be located on a side wall of the housing 211, or on the cover plate 212, or at a position where two walls of the housing 211 intersect, which is not limited in the embodiments of the present application.

The pressure relief mechanism 213 may be various possible pressure relief structures, which is not limited in the embodiments of the present application. For example, the pressure relief mechanism 213 may be a temperature-sensitive pressure relief mechanism, the temperature-sensitive pressure relief mechanism is configured to be capable of being melted when the internal temperature of the battery cell 20 provided with the pressure relief mechanism 213 reaches a threshold; and/or the pressure relief mechanism 213 may be a pressure-sensitive pressure relief mechanism, and the pressure-sensitive pressure relief mechanism is configured to be capable of being fractured when an internal gas pressure of the battery cell 20 provided with the pressure relief mechanism 213 reaches a threshold.

The battery 10 consisting of the battery cells 20 can be applied to a power consumption apparatus to supply electric energy for the power consumption apparatus. However, the existence of structural members in the battery 10 may reduce the volumetric energy density of the battery 10 and affects the battery life of the power consumption apparatus. In view of this, the present application provides a battery 10, such as a battery 10 shown in FIG. 6. The volumetric energy density of the battery 10 can be increased by the battery 10 according to the embodiments of the present application.

Figure 6:
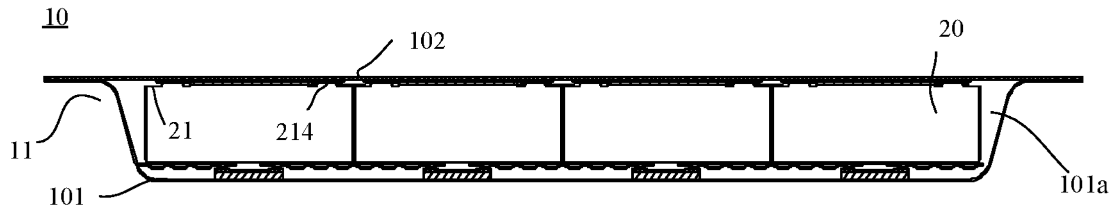
FIG. 6 is a schematic structural diagram of a battery disclosed in an embodiment of the present application.

Specifically, as shown in FIG. 6, the battery 10 may include a plurality of battery cells 20 and a box 11.

As an implementation manner, a first surface 21 of each battery cell 20 of the plurality of battery cells 20 is provided with an electrode terminal 214.

As an implementation manner, the box 11 includes: a first portion 101, the first portion 101 forming an accommodating chamber 101*a* having an opening; where the plurality of battery cells 20 are accommodated in the accommodating chamber 101*a*, and the first surface 21 is configured to be fixedly connected to a cover 102 covering the opening to fixedly connect the plurality of battery cells 20 to the cover 102.

In a current battery design, in order to fix the battery cells 20, it is generally necessary to provide box beams such as cross beams and longitudinal beams to lock and fix the battery cells 20, but the existence of the box beams may reduce the volumetric energy density of the battery. In an embodiment of the present application, by fixing the surface of the battery cell 20 provided with the electrode terminal 214 to the cover 102, on the one hand, fixing of the battery cells 20 can be realized. Secondly, the battery cells 20 are fixed to the cover 102, and it is unnecessary to use structural members such as box beams to lock and fix the battery cells 20, thereby reducing the use of structural members in the battery, increasing the volumetric energy density of the battery, and further improving the battery life of the power consumption apparatus.

In an embodiment of the present application, the plurality of battery cells 20 may be adhesively fixed to the cover 102 by an adhesive, such as glue and a structural adhesive. Specifically, the first surface 21 is adhesively fixed to the cover 102 to fixedly connect the plurality of battery cells 20 to the cover 102. Alternatively, the first surface 21 may be fixed to the cover 102 by other means, for example, riveting, which is not limited in the embodiments of the present application.

The first surface 21 is fixed to the cover 102 by means of adhesion. On the one hand, the use of structural members, such as box beams, can be reduced and avoided, and the volumetric energy density of the battery can be increased; and on the other hand, assembly complexity can be simplified, and the production efficiency of the battery can be improved.

As an implementation manner, the cover 102 is located above the first portion 101 after the box 11 is mounted to a vehicle.

Optionally, the battery 10 may be mounted in for example the vehicle 1 shown in FIG. 1. When the battery 10 is mounted to the vehicle through the box 11, the cover 102 is located above the first portion 101, that is, the plurality of battery cells 20 are located in a direction of gravity of the cover 102. Since the plurality of battery cells 20 are fixed to the cover 102, the cover 102 may be used as a main load-bearing structure. In this way, stability of the plurality of battery cells 20 in the box 11 can be improved, and the overall structural strength of the battery can be improved.

In an implementation manner, the cover 102 is a floor of the vehicle.

In an embodiment of the present application, a floor of the vehicle can be directly used as the cover 102 fixing the battery cells 20. The plurality of battery cells 20 are fixed to the floor of the vehicle as the cover 102 due to high strength and rigidity of the floor of the vehicle, which can improve the overall rigidity and strength of the battery 10 and further realize the integration of the battery 10 with the vehicle. Further, the battery cells 20 are fixed to the floor of the vehicle, which can avoid or reduce the use of box beams, thereby increasing the volumetric energy density of the battery 10.

As another implementation manner, the cover 102 is a second portion of the box, and the second portion is fastened to the first portion 101 to cover the opening.

In an embodiment of the present application, the cover 102 may be a portion of the floor of the vehicle, or the cover 102 may be a portion independent of the floor of the vehicle, that is, a second portion. In this case, the first portion 101 and the second portion are fastened to each other to form the accommodating chamber 101a accommodating the battery cells 20. Then, the box 11 consisting of the first portion 101 and the second portion can be mounted to a power consumption apparatus for use, such as a vehicle, and the construction of this box independent of the vehicle can flexibly adapt to needs of different situations.

Optionally, the first portion 101 in the embodiment of the present application may be fixedly connected to the cover 102 in various fixing manners, such as bonding, riveting and welding, which is not limited in the embodiments of the present application.

In an embodiment of the present application, an insulating layer may be disposed on the first surface 21 of the battery cell 20 provided with the electrode terminal 214, thereby separating the battery cell 20 from the cover 102 and ensuring the safe use of the battery.

Specifically, a connecting region between the first surface 21 and the cover 102 is provided with a first insulating layer 211, and the first insulating layer 211 is configured to separate the first surface 21 from the cover 102.

Figure 7:
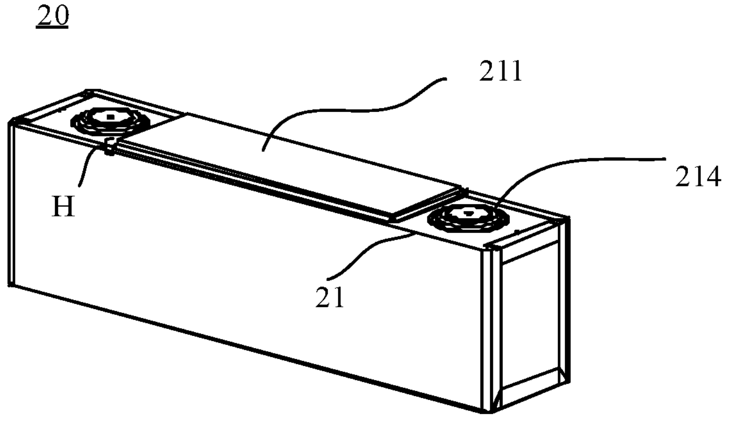
FIG. 7 is a schematic structural diagram of a battery cell disclosed in an embodiment of the present application.

FIG. 7 shows a schematic diagram of a battery cell 20 provided with a first insulating layer 211 according to an embodiment of the present application. As shown in FIG. 7, the first insulating layer 211 may be disposed in a region between two electrode terminals 214 on the first surface 21.

Alternatively or optionally, the first insulating layer 211 in the embodiment of the present application may cover a region where the electrode terminals 214 are located. Specifically, the electrode terminals 214 may be electrically connected through a bus component, and the first insulating layer 211 may cover the entire first surface 21 after the electrical connection, which is not limited in the embodiments of the present application, as long as the insulation and separation between the battery cells 20 and the cover 102 can be realized.

The first insulating layer 211 can be connected to the first surface 21 in the embodiment of the present application.

As an implementation manner, the first insulating layer 211 and the first surface 21 are an integral structure.

For example, in the production of the battery cell 20, a groove may be provided on the surface of the shell of the battery cell 20, and then an insulating material such as plastic is poured in the groove through an injection molding process to form the first insulating layer 211. In this case, the first insulating layer 211 and the battery cell 20 can be an integral structure.

Alternatively or optionally, the first insulating layer 211 may be an insulating sheet fixed to the first surface 21. The insulating sheet may be an insulating material such as plastic.

By selecting different implementation manners of the first insulating layer 211, the production process of the battery 10 can be flexibly adjusted to adapt to different needs.

As an implementation manner, a gap is provided between the electrode terminal 214 and the cover 102 after the first surface 21 is fixed to the cover 102.

By reserving a gap between the electrode terminal 214 and the cover 102, the separation between the electrode terminal 214 and the cover 102 can be maintained to realize mutual insulation, which ensures the safe use of the battery.

The height H of the first insulating layer 211 disposed on the battery cell 20 in the embodiment of the present application may be higher than the height of the electrode terminals 214 after the electrical connection, for example, by about 3~4 mm. In this way, a gap is left between the electrode terminals 214 and the cover 102 for insulation after the first surface 21 is fixed to the cover 102, thereby ensuring the normal use of the battery 10.

Alternatively or optionally, the height H of the first insulating layer 211 may be less than or equal to the height of the electrode terminals 214 after the electrical connection. After the first surface 21 is fixed to the cover 102, a gap can be left between the electrode terminals 214 after the electrical connection and the cover 102 for insulation with the thickness of an adhesive, such as a structural adhesive, which is not limited in the embodiments of the present application.

Figure 8:
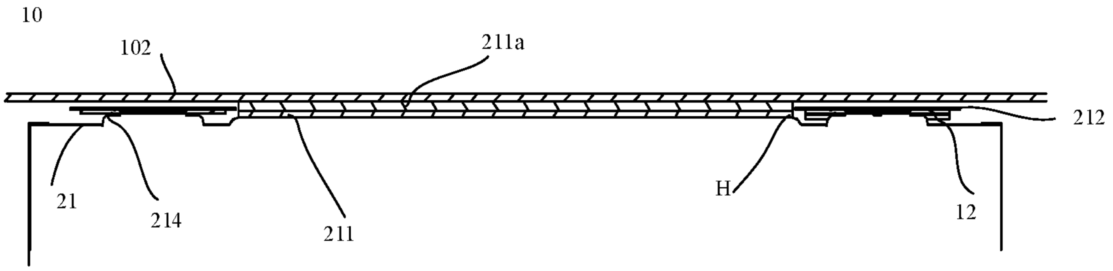
FIG. 8 is a partially detailed view of a battery disclosed in an embodiment of the present application.

FIG. 8 shows a partially detailed view of a battery 10 provided with a first insulating layer 211 according to an embodiment of the present application. As shown in FIG. 7 and FIG. 8, the height H of the first insulating layer 211 is lower than the height of the electrode terminals 214 after the electrical connection. However, after the first surface 21 is fixed to the cover 102 by a structural adhesive 211*a*, a gap is still left between the electrode terminals 214 and the cover 102, so that the separation between the electrode terminals 214 and the cover 102 can be realized.

As an implementation manner, the battery 10 may further include: a bus component 12 configured to be electrically connected to the electrode terminal 214, a second insulating layer 212 being disposed on the bus component 12, and the second insulating layer 212 being configured to separate the electrode terminal 214 from the cover 102.

Figure 9:
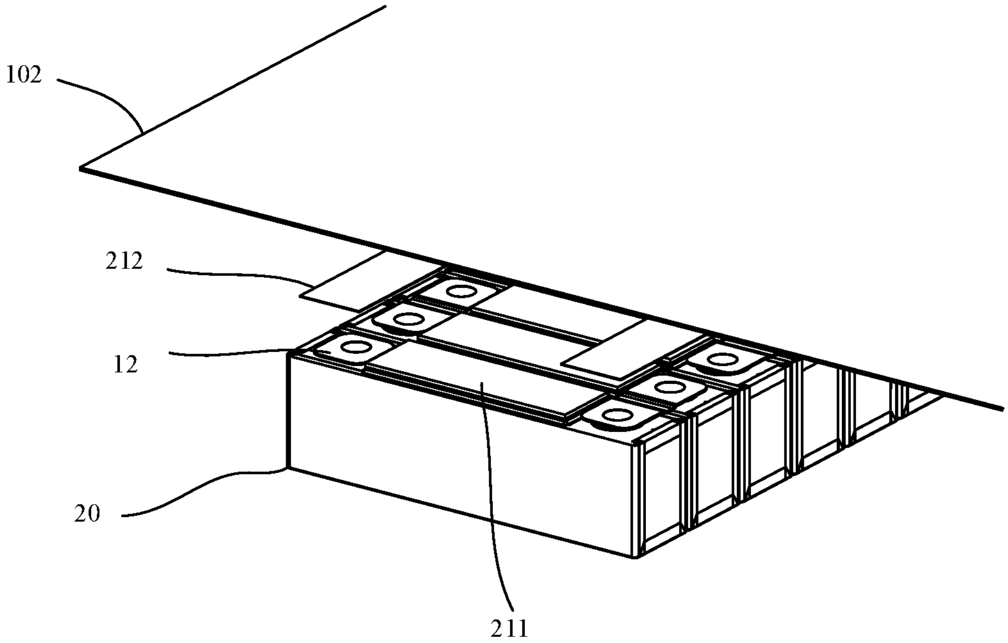
FIG. 9 is a schematic partial structural diagram of a battery disclosed in an embodiment of the present application.

FIG. 9 shows a schematic partial structural diagram of a battery 10 having a second insulating layer 212. As shown in FIG. 9, a bus component 12 is disposed on the electrode terminals 214 of the battery cell 20, and a second insulating layer 212 is disposed above the bus component 12 for separation. Specifically, in this case, the electrical terminals 214 can be electrically connected using the bus component 12 first, and after the electrical connection, the second insulating layer 212 is disposed above the bus component 12 to insulate and separate the electrode terminals 214 from the cover 102, which ensures the normal use of the battery.

Optionally, in an embodiment of the present application, a gap may be left between the second insulating layer 212 and the cover 102, or they may contact with each other, which is not limited in the present application.

The heights of the first insulating layer 211, the structural adhesive 211*a* and the second insulating layer 212 in the embodiments of the present application can be adjusted adaptively, so as to realize the insulation and separation between the battery cells 20 and the cover 102. For example, when the second insulating layer 212 is not provided, the height H of the first insulating layer 211 can be higher than the height of the electrode terminals 214 after the electrical connection; or the height H of the first insulating layer 211 can be lower than the height of the electrode terminals 214 after the electrical connection, and the height of the battery cell 20 after bonding with the structural adhesive 211*a* should be higher than that of the electrode terminals 214 after the electrical connection. Alternatively, when the second insulating layer 212 is provided, the height of the first insulating layer 211 and/or the structural adhesive 211*a* can be higher than the height of the electrode terminals 214 electrically connected and provided with the second insulating layer 212, as long as the separation between the battery cells 20 and the cover 102 can be realized, which is not limited in the present application.

For a battery, a main safety hazard comes from charging and discharging processes, and in order to improve safety performance of the battery, a battery cell 20 is generally provided with a pressure relief mechanism 213. The pressure relief mechanism 213 refers to an element or component that is actuated when an internal pressure or temperature of the battery cell 20 reaches a predetermined threshold, to relieve the internal pressure or temperature. The predetermined threshold may be adjusted according to different design needs. The predetermined threshold may depend on materials of one or more of a positive electrode sheet, a negative electrode sheet, an electrolytic solution and a separator in the battery cell 20.

The pressure relief mechanism 213 on the battery cell 20 has an important impact on the safety of the battery. For example, when short circuit, overcharge and other phenomena occur in the battery cell, it may lead to thermal runaway in the interior of the battery cell 20, resulting in a sudden increase in pressure or temperature. In this case, the internal pressure and temperature can be released outward through the actuation of the pressure relief mechanism 213, to prevent the battery cell from exploding and catching fire.

As an implementation manner, the battery cell 20 includes a pressure relief mechanism 213, the pressure relief mechanism 213 is disposed on a second surface 22 of the battery cell 20 opposite to the first surface 21, and the pressure relief mechanism 213 is configured to be actuated when an internal pressure or temperature of the battery cell 20 provided with the pressure relief mechanism 213 reaches a threshold, to relieve the internal pressure.

The pressure relief mechanism 213 in the embodiment of the present application may be in the form of the pressure relief mechanism 213 shown in FIG. 5.

Figure 10:
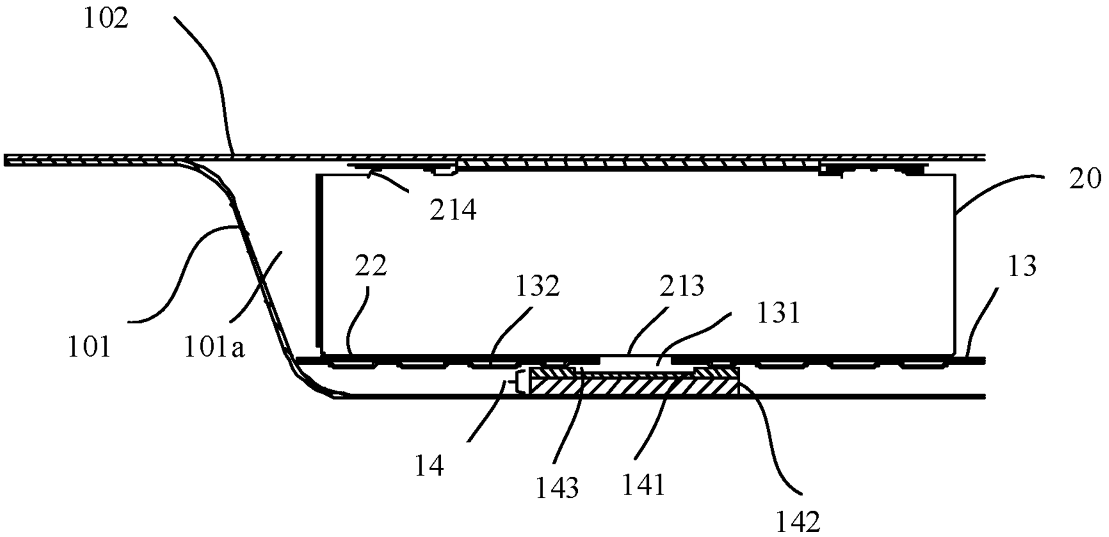
FIG. 10 is a schematic partial structural diagram of a battery disclosed in another embodiment of the present application.

FIG. 10 shows a schematic partial structural diagram of a battery 10 according to an embodiment of the present application. As shown in FIG. 10, the pressure relief mechanism 213 is disposed on the second surface 22 of the battery cell 20 and faces a bottom wall of the first portion 101.

By disposing the pressure relief mechanism 213 on a surface without the electrode terminal 214, the temperature or pressure released during the thermal runaway of the battery cell 20 does not affect the electrode terminal 214, such as occurrence of short circuit, which enhances the safety of the battery. Meanwhile, the pressure relief mechanism 213 in the embodiment of the present application is disposed at a position close to the first portion 101 of the box 11, and after the battery 10 is normally mounted to a power consumption apparatus, the pressure relief mechanism 213 is located at the bottom of the battery cell 20. In this way, when the temperature or pressure is released during the thermal runaway of the battery cell 20, the discharge direction of the emissions is toward the bottom of the vehicle, which does not cause harm to the vehicle or passengers.

As an implementation manner, the battery 10 further includes: a thermal management component 13, the thermal management component 13 being configured to accommodate a fluid to adjust a temperature of the plurality of battery cells 20, the thermal management component 13 being attached to the second surface 22, a predetermined gap being provided between the thermal management component 13 and the accommodating chamber 101*a,* a pressure relief region 131 corresponding to the pressure relief mechanism 213 being disposed on the thermal management component 13, and the pressure relief region 131 being configured for emissions to pass when the pressure relief mechanism 213 is actuated.

As shown in FIG. 10, the thermal management component 13 is disposed under the battery cell 20, and more specifically, is fixed to the second surface 22 of the battery cell 20. Optionally, the thermal management component 13 may be fixed to the second surface 22 by an adhesive or the like. By disposing the thermal management component 13 under the battery cell 20, the heat exchange efficiency between the thermal management components 13 and the battery cell 20 can be improved, and the temperature adjustment effect on the battery cell 20 can be improved.

Optionally, an interior of the thermal management component 13 may have a flow channel 132, and the flow channel 132 may be configured to accommodate a fluid to adjust a temperature of the plurality of battery cells 20.

Further, a pressure relief region 131 corresponding to the pressure relief mechanism 213 may be disposed on the thermal management component 13. Through the pressure relief religion 131, the temperature or pressure released via the pressure relief mechanism 213 after the thermal runaway of the battery cell 20 can be discharged to the exterior of the battery cell 20, thereby ensuring the normal use of the pressure relief mechanism 213.

Optionally, the pressure relief region 131 in the embodiment of the present application may be a through hole or a weakened structure. For example, a position on the thermal management component 13 corresponding to the pressure relief mechanism 213 can be set thinner than other regions of the thermal management component 13. In this way, when the pressure relief mechanism 213 is actuated, the emissions can break through the weakened structure, thereby realizing the release of the inner temperature and pressure of the battery cell 20 and enhancing the safety of the battery. Alternatively, the pressure relief region 131 in the embodiment of the present application may be in other forms, which is not limited in the embodiments of the present application.

In an embodiment of the present application, a predetermined gap is provided between the thermal management component 13 and the bottom wall of the first portion 101. In this way, after the thermal runaway of the battery cell 20, the emissions can enter the gap after passing through the pressure relief region 131. Since the gap is air, the emissions can be cooled to a certain extent, which reduces the risk of the emissions and enhances the safety of the battery.

As an implementation manner, the battery further includes: a bottom protective structure 14, the bottom protective structure 14 being disposed opposite to the pressure relief mechanism 213, and the bottom protective structure 14 being attached to a surface of the thermal management component 13 away from the plurality of battery cells 20.

When the bottom of the battery 10 is invaded by foreign matters, the pressure relief mechanism 213 may be damaged by the foreign matters, so that the battery cell 20 cannot be used normally. In order to prevent abnormal damage of the pressure relief mechanism 213, the pressure relief mechanism 213 can be protected in the embodiment of the present application. By disposing the bottom protective structure 14 corresponding to the pressure relief mechanism 213 under the thermal management component 13, the pressure relief mechanism 213 can be prevented from being damaged when the battery 10 is invaded by foreign matters, thereby ensuring the normal use of the battery cells 20 and enhancing the safety of the battery.

Optionally, the bottom protective structure 14 in the embodiment of the present application includes: an avoidance portion 141 and a cushioning portion 142, the cushioning portion 142 being disposed under the avoidance portion 141, where the avoidance portion 141 is configured to provide a relief space for the pressure relief mechanism 213, and the cushioning portion 142 is configured to protect the pressure relief mechanism 213.

Figure 11:
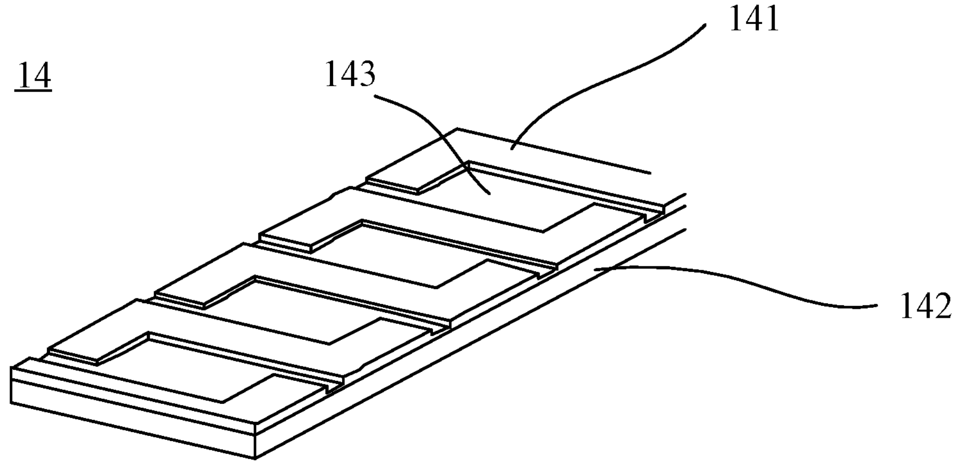
FIG. 11 is a schematic structural diagram of a bottom protective structure disclosed in an embodiment of the present application.

FIG. 11 shows a schematic structural diagram of a bottom protective structure 14 in an embodiment of the present application. As shown in FIG. 10 and FIG. 11, the bottom protective structure 14 consists of an avoidance portion 141 and a cushioning portion 141, where the avoidance portion 141 can form an avoidance chamber 143, and the avoidance chamber 143 is provided with an opening to ensure the normal actuation of the pressure relief mechanism 213. The cushioning portion 142 is fixed under the avoidance portion 141 to protect the pressure relief mechanism 213.

By providing the avoidance portion 141 and the cushioning portion 143, on the one hand, the normal actuation of the pressure relief mechanism 213 is ensured; and on the other hand, the damage caused by the foreign matters can be cushioned using the cushioning portion, and the pressure relief mechanism 213 is prevented from being damaged when invaded by the foreign matters while ensuring the normal use of the pressure relief mechanism 213, thereby ensuring the normal use of the battery and enhancing the safety of the battery.

Optionally, engineering plastics with high hardness may be adopted for the avoidance portion 141, and a cushion substance with an energy absorption effect may be adopted for the cushioning portion 142, such as a rubber material or non-flammable foam material.

Optionally, the bottom protective structure 14 in the embodiment of the present application may be in another structure, for example, may further include a mainboard portion, the mainboard portion may be fixed under the cushioning portion 142, the mainboard portion may have good mechanical strength to protect the cushioning portion 142, and the specific structure of the bottom protective structure 14 is not limited in the present application.

Optionally, the bottom protective structure 14 in the embodiment of the present application may be fixed by an adhesive, or by other means, such as welding and riveting, which is not limited in the embodiments of the present application.

As an implementation manner, the plurality of battery cells 20 form a plurality of battery cell groups 200, each battery cell group 200 includes a plurality of battery cells 20 arranged along a first direction, the plurality of battery cell groups 200 are arranged along a second direction, and the second direction is perpendicular to the first direction, where a spacer plate 15 is provided between the plurality of battery cell groups 200.

Figure 12:
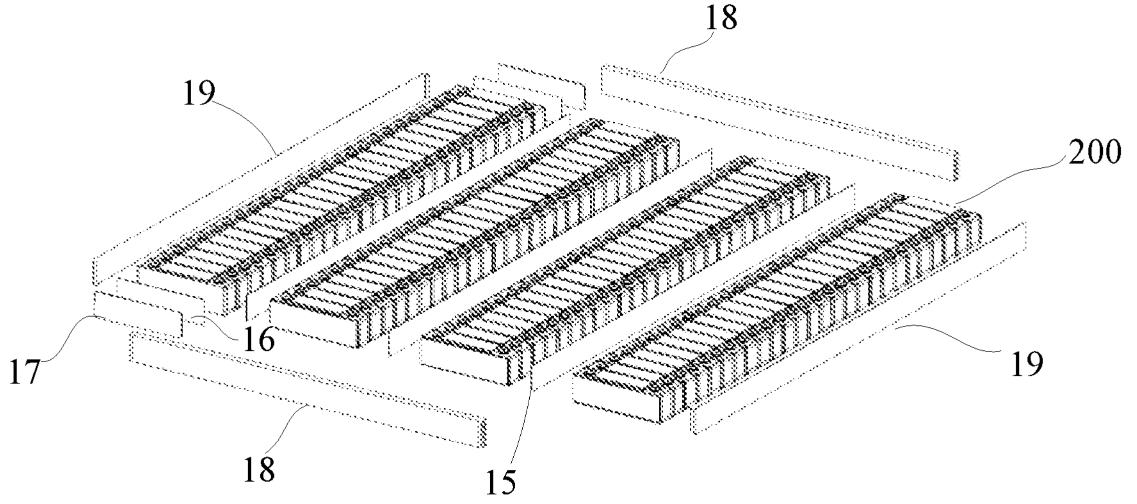
FIG. 12 is a schematic structural diagram of a battery cell group disclosed in an embodiment of the present application.
Figure 13A:
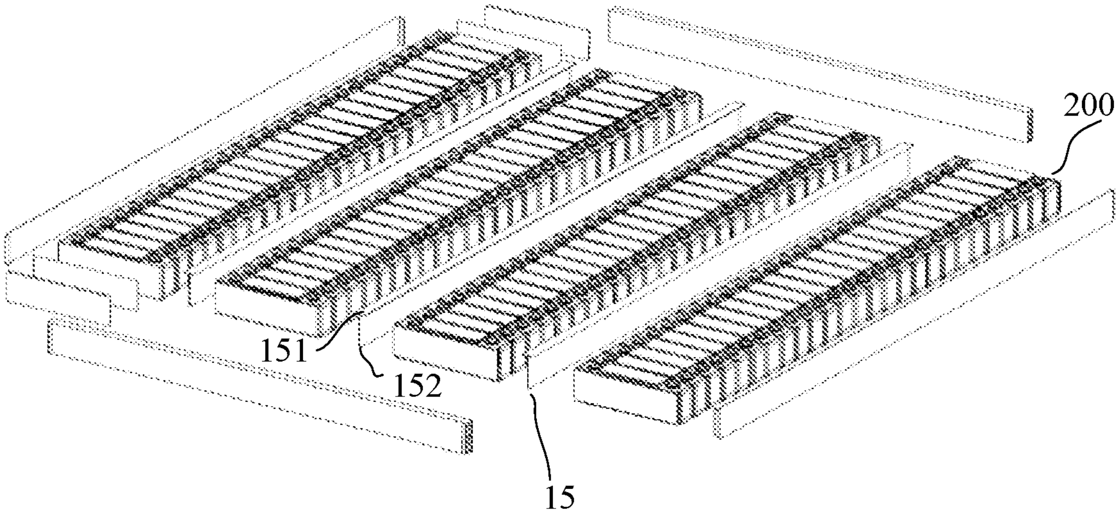
FIG. 13A to FIG. 13D are schematic structural diagrams of another battery cell group disclosed in an embodiment of the present application.
Figure 13B:
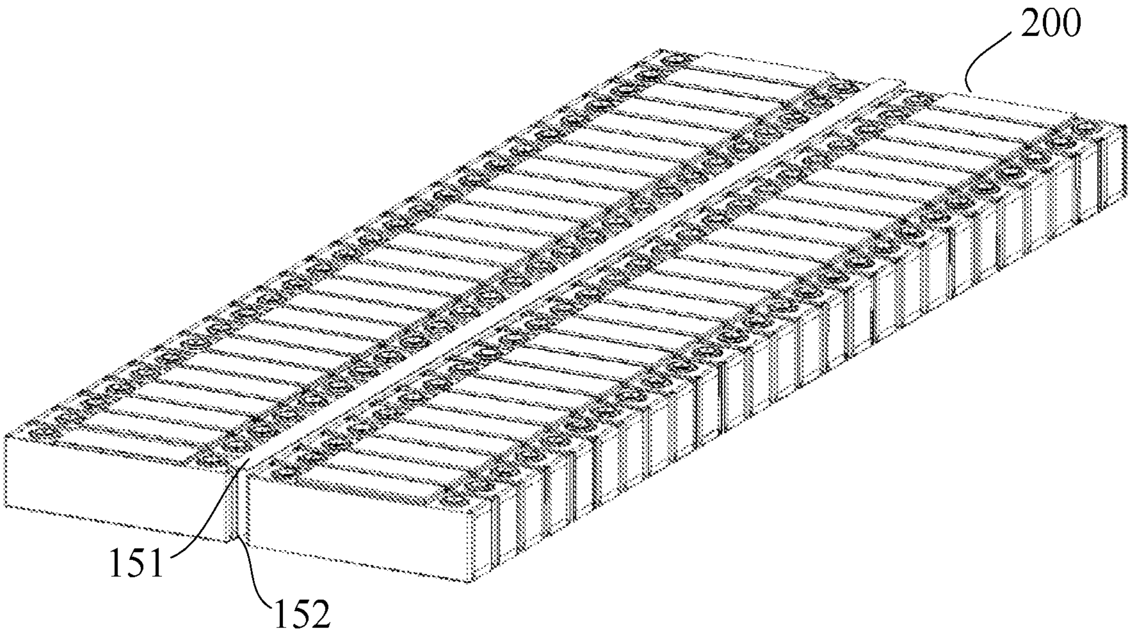
Figure 13C:
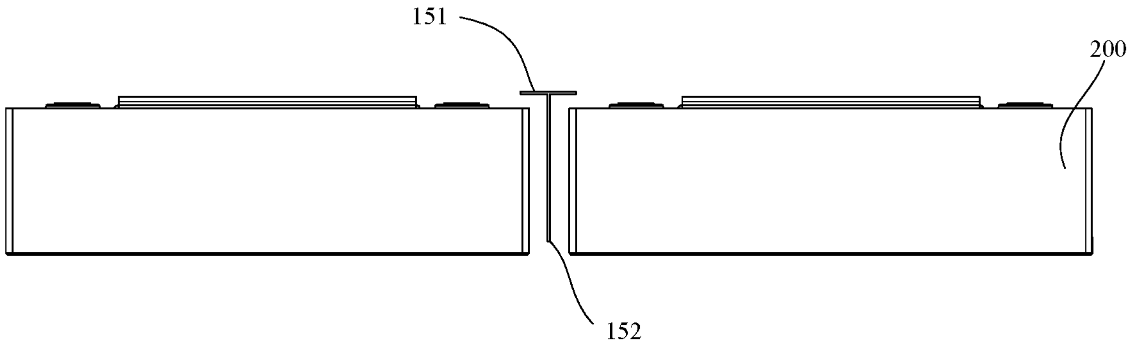
Figure 13D:
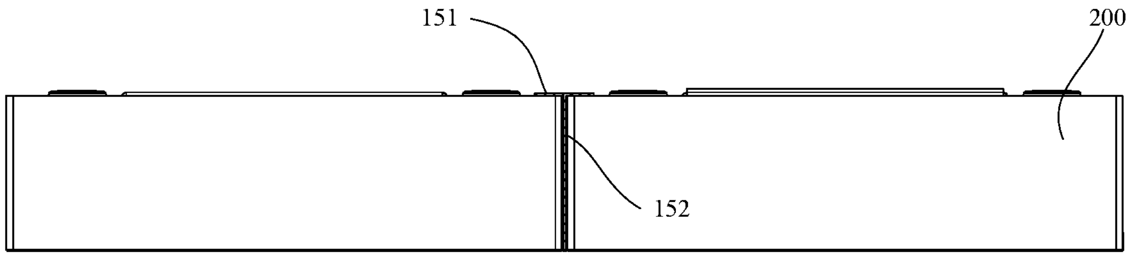

FIG. 12 shows a schematic structural diagram of a battery cell group 200 according to an embodiment of the present application. As shown in FIG. 12, the battery 10 includes four battery cell groups 200, where a spacer plate 15 is provided between adjacent battery cell groups 200.

It should be understood that the embodiment of the present application is described by an example of only four battery cell groups 200, and in practice, the number of battery cell groups 200 can be set flexibly.

By providing the spacer plate between the plurality of battery cell groups 200, the plurality of battery cell groups 200 can be separated from each other, and the overall rigidity and structural strength of the battery 10 can be improved.

Further, the spacer plate 15 may be an insulating material.

As an implementation manner, the spacer plate 15 includes a first sub-plate 151 and a second sub-plate 152, and the first sub-plate 151 and the second sub-plate 152 form a T-shaped structure.

FIG. 13A to FIG. 13D show schematic structural diagrams of a battery cell group 200 having a T-shaped spacer plate 15 according to an embodiment of the present application. As shown in FIG. 13A to FIG. 13D, a first sub-plate 11 of the T-shaped spacer plate is placed above a second sub-plate 152, that is, there is a flange on the second sub-plate 152, and the flange is the first sub-plate 151.

In the battery 10, a voltage difference between two adjacent battery cells 20 can reach up to 150V. When the aluminum shells of the battery cells 20 are exposed and conducted, high-voltage arcing occurs between two adjacent battery cells 20, which has a high safety risk. According to the T-shaped spacer plate 15 provided in the embodiment of the present application, more specifically, the first sub-plate 151 and the second sub-plate 152 can effectively prevent the aluminum shells of two battery cells 20 from being conducted with each other, thereby insulating and protecting the two adjacent battery cells 20 and enhancing the safety of the battery. Meanwhile, the T-shaped spacer plate 15 can also improve the overall rigidity and structural strength of the battery 10.

Optionally, the T-shaped spacer plate in the embodiment of the present application may be fixed to the battery cells 20 by coating the surfaces of the first sub-plate 151 and/or the second sub-plate 152 with an adhesive; or it may be fixed to the cover 102 by coating the surface of the first sub-plate 151 with an adhesive. Alternatively, the embodiment of the present application may adopt other fixing manners other than bonding, which is not limited in the embodiments of the present application.

As an implementation manner, the battery 10 further includes: an insulating sheet 16, the insulating sheet 16 being disposed at both ends of the each battery cell group 200 along the first direction; and/or a cushion 17, the cushion 17 being disposed at both ends of the each battery cell group 200 along the first direction.

According to the insulating sheet 16 and the cushion 17 shown in FIG. 12, by providing the insulating sheet 16, the insulation between the box 11 of the battery and the battery cells 20 can be realized; and by providing the cushion 17, it is helpful to release expansion and deformation of the battery cells 20 after multiple cycles of operation.

Optionally, the number of spacer plates 15, insulating sheets 16 and cushions 17 in the embodiments of the present application can be determined according to actual situations, which is not limited in the embodiments of the present application.

As an implementation manner, the battery 10 further includes: two end plates 18, the two end plates 18 being respectively disposed at both ends of the plurality of battery cell groups 200 along the first direction, and two side plates 19, the two side plates 19 being respectively disposed at both ends of the plurality of battery cell groups 200 along the second direction, where the two end plates 18 and the two side plates 19 are fixedly connected to each other.

According to the end plates 18 and the side plates 19 shown in FIG. 12, the end plates 18 and the side plates 19 may be fixedly connected to each other by different means, such as welding, riveting and bolting, so as to fix the battery cells 20 in the box 10, which improves the overall rigidity and structural strength of the battery, and can resist the expansion of the battery cells 20 caused after multiple cycles and enhance the safety of the battery.

Figure 14:
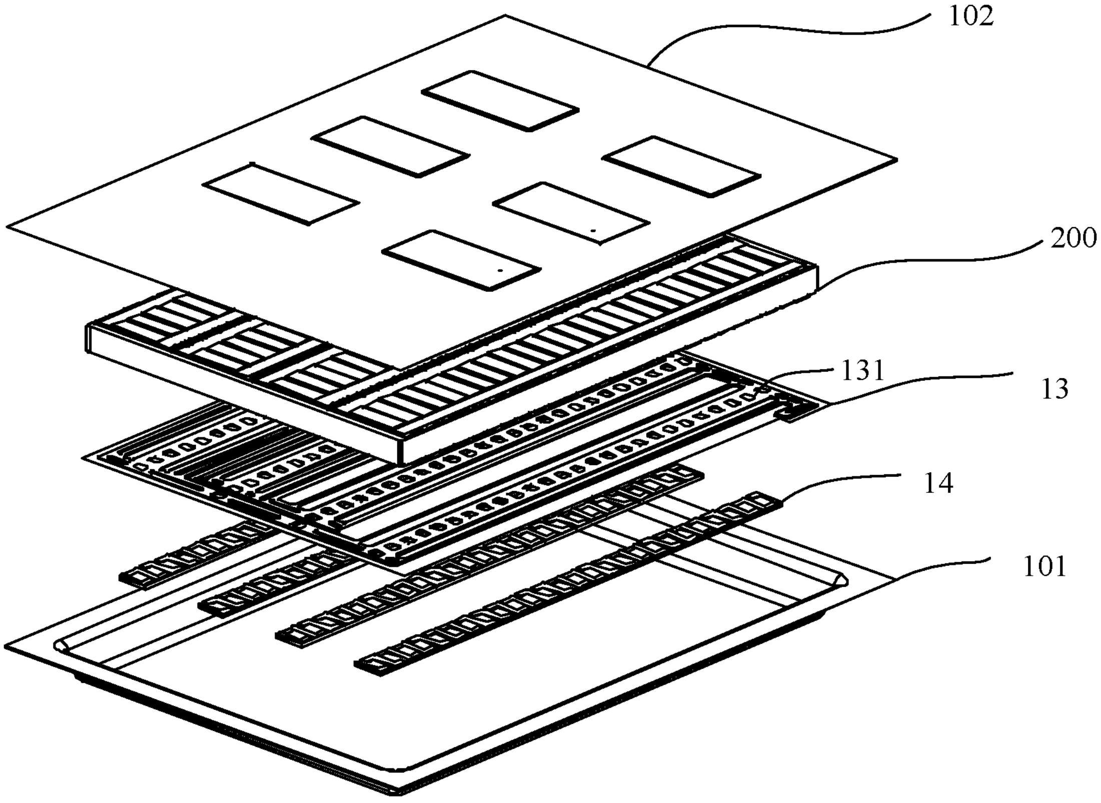
FIG. 14 is an exploded view of a battery disclosed in an embodiment of the present application.

FIG. 14 shows a schematic exploded view of a battery according to an embodiment of the present application. As shown in FIG. 14, the battery 10 may include a plurality of battery cells 20 and the box 11 in the foregoing various embodiments.

For the description of each component in the battery 10, reference may be made to the foregoing various embodiments, which will not be repeated redundantly here for brevity.

Optionally, according to the battery 10 in the embodiments of the present application, the first portion 101, the bottom protective structure 14, the thermal management component 13 and the battery cell group 200 can be fixedly connected to each other in sequence, next, the battery cell 20 is fixed to the cover 102 through the first surface 21, and then the first portion 101 may be fixed to the cover 102 to form a closed cavity for accommodating the battery cells 20.

An embodiment of the present application further provides a power consumption apparatus, and the power consumption apparatus may include the battery 10 in the foregoing various embodiments. Optionally, the power consumption apparatus may be the vehicle 1, a ship or a spacecraft.

The battery cell, the battery and the power consumption apparatus according to the embodiments of the present application are described above. A method and apparatus for producing a battery according to the embodiments of the present application will be described below, and for the parts that are not described in detail, reference may be made to the foregoing various embodiments.

Figure 15:
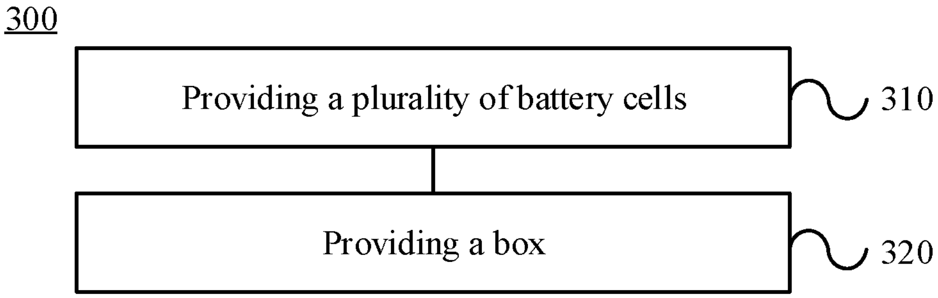
FIG. 15 is a schematic flowchart of a method for producing a battery disclosed in an embodiment of the present application.

FIG. 15 shows a schematic flowchart of a method 300 for producing a battery according to an embodiment of the present application. As shown in FIG. 15, the method 300 may include the following steps.

310, a plurality of battery cells 20 are provided.

A first surface 21 of each battery cell 20 of the plurality of battery cells 20 is provided with an electrode terminal 214.

320, a box 11 is provided.

As an implementation manner, the box 11 includes: a first portion 101, the first portion 101 forming an accommodating chamber 101*a* having an opening; where the plurality of battery cells 20 are accommodated in the accommodating chamber 101*a*, and the first surface 21 is configured to be fixedly connected to a cover 102 covering the opening to fixedly connect the plurality of battery cells 20 to the cover 102.

Figure 16:
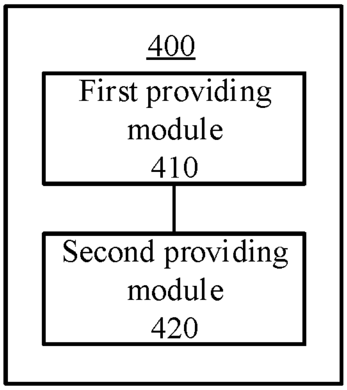
FIG. 16 is a schematic block diagram of an apparatus for producing a battery disclosed in an embodiment of the present application.

FIG. 16 shows a schematic block diagram of an apparatus 400 for producing a battery according to an embodiment of the present application. As shown in FIG. 16, the apparatus 400 for producing the battery may include: a first providing module 410 and a second providing module 420.

The first providing module 410 is configured to provide a plurality of battery cells 20. A first surface 21 of each battery cell 20 of the plurality of battery cells 20 is provided with an electrode terminal 214.

The second providing module 420 is configured to provide a box 11, and the box 11 includes: a first portion 101, the first portion 101 forming an accommodating chamber 101*a* having an opening; where the plurality of battery cells 20 are accommodated in the accommodating chamber 101*a*, and the first surface 21 is configured to be fixedly connected to a cover 102 covering the opening to fixedly connect the plurality of battery cells 20 to the cover 102.

Although the present application has been described with reference to some embodiments thereof, various modifications can be made thereto without departing from the scope of the present application, and the components therein can be replaced with equivalents. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A battery for a vehicle, comprising:

a battery cell, the battery cell having a surface provided with two electrode terminals; and a box, a portion of the box forming an accommodating chamber having an opening;

wherein the battery cell is accommodated in the accommodating chamber, the surface of the battery cell is configured to be fixedly connected to a cover covering the opening, a connecting region between the surface of the battery cell and the cover includes an insulating layer, the insulating layer comprising a first insulating layer disposed on the surface of the battery cell and configured to separate the surface of the battery cell from the cover, the first insulating layer being formed in a groove on the surface of the battery cell such that the first insulating layer and the surface of the battery cell are an integral structure, the first insulating layer being disposed in a region between the two electrode terminals on the surface of the battery cell, a height of the insulating layer and/or of a structural adhesive used to bond the surface of the battery cell to the cover is greater than a height of at least one electrode terminal of the two electrode terminals after electrical connection, such that a gap is provided between the at least one electrode terminal and the cover after the surface of the battery cell is fixed to the cover, and in an installed orientation of the battery within the vehicle, the cover is positioned above the accommodating chamber portion of the box and forms at least a portion of a floor panel of the vehicle.

2. The battery according to claim 1, wherein the cover is fastened to the portion of the box to cover the opening.

3. The battery according to claim 1, further comprising:

a bus component configured to be electrically connected to the at least one electrode terminal, a second insulating layer being disposed on the bus component, and the second insulating layer being configured to separate the at least one electrode terminal from the cover.

4. The battery according to claim 1, wherein:

the surface of the battery cell is a first surface of the battery cell; and the battery cell comprises a pressure relief mechanism, the pressure relief mechanism is disposed on a second surface of the battery cell opposite to the first surface of the battery cell, and the pressure relief mechanism is configured to be actuated in response to an internal pressure or temperature of the battery cell reaching a threshold, to relieve the internal pressure.

5. The battery according to claim 4, further comprising:

a thermal management component, the thermal management component being configured to accommodate a fluid to adjust a temperature of the battery cell, the thermal management component being attached to the second surface of the battery cell, a predetermined gap being provided between the thermal management component and a bottom wall of the accommodating chamber, a pressure relief region corresponding to the pressure relief mechanism being provided at the thermal management component, and the pressure relief region being configured for emissions to pass when the pressure relief mechanism is actuated.

6. The battery according to claim 4, further comprising:

a bottom protective structure, the bottom protective structure being disposed opposite to the pressure relief mechanism, and the bottom protective structure being attached to a surface of the thermal management component away from the battery cell.

7. The battery according to claim 6, wherein the bottom protective structure comprises:

an avoidance portion and a cushioning portion, the cushioning portion being disposed under the avoidance portion, wherein the avoidance portion is configured to provide a relief space for the pressure relief mechanism, and the cushioning portion is configured to protect the pressure relief mechanism.

8. The battery according to claim 1, wherein:

the battery cell is one of a plurality of battery cells of the battery;

the plurality of battery cells form a plurality of battery cell groups each comprising two or more battery cells of the plurality of battery cells, the two or more battery cells being arranged along a first direction;

the plurality of battery cell groups are arranged along a second direction, and the second direction is perpendicular to the first direction; and a spacer plate is provided between neighboring ones of the plurality of battery cell groups.

9. The battery according to claim 8, wherein the spacer plate comprises a first sub-plate and a second sub-plate, and the first sub-plate and the second sub-plate form a T- shaped structure.

10. The battery according to claim 8, further comprising at least one of:

an insulating sheet, the insulating sheet being disposed at both ends of each of the battery cell groups along the first direction; or a cushion, the cushion being disposed at both ends of each of the battery cell groups along the first direction.

11. The battery according to claim 8, further comprising:

two end plates, the two end plates being respectively disposed at two ends of the plurality of battery cell groups along the first direction; and two side plates, the two side plates being respectively disposed at two ends of the plurality of battery cell groups along the second direction;

wherein the two end plates and the two side plates are fixedly connected to each other.

12. The battery according to claim 1, wherein the surface of the battery cell is adhesively fixed to the cover to fixedly connect the battery cell to the cover.

13. An electric vehicle, comprising:

a battery configured to supply electric energy to the electric vehicle, the battery comprising:

a battery cell, the battery cell having a surface provided with two electrode terminals; and a box, a portion of the box forming an accommodating chamber having an opening;

wherein the battery cell is accommodated in the accommodating chamber, the surface of the battery cell is configured to be fixedly connected to a cover covering the opening, a connecting region between the surface of the battery cell and the cover includes an insulating layer, the insulating layer comprising a first insulating layer disposed on the surface of the battery cell and configured to separate the surface of the battery cell from the cover, the first insulating layer being formed in a groove on the surface of the battery cell such that the first insulating layer and the surface of the battery cell are an integral structure, the first insulating layer being disposed in a region between the two electrode terminals on the surface of the battery cell, a height of the insulating layer and/or of a structural adhesive used to bond the surface of the battery cell to the cover is greater than a height of at least one electrode terminal of the two electrode terminals after electrical connection, such that a gap is provided between the at least one electrode terminal and the cover after the surface of the battery cell is fixed to the cover, and in an installed orientation of the battery within the electric vehicle, the cover is positioned above the accommodating chamber portion of the box and forms at least a portion of a floor panel of the electric vehicle.

14. A method for producing a battery for a vehicle, comprising:

providing a battery cell, the battery cell having a surface provided with two electrode terminals; and providing a box, a portion of the box forming an accommodating chamber having an opening;

wherein the battery cell is accommodated in the accommodating chamber, the surface of the battery cell is configured to be fixedly connected to a cover covering the opening, a connecting region between the surface of the battery cell and the cover includes an insulating layer, the insulating layer comprising a first insulating layer disposed on the surface of the battery cell and configured to separate the surface of the battery cell from the cover, the first insulating layer being formed in a groove on the surface of the battery cell such that the first insulating layer and the surface of the battery cell are an integral structure, the first insulating layer being disposed in a region between the two electrode terminals on the surface of the battery cell, a height of the insulating layer and/or of a structural adhesive used to bond the surface of the battery cell to the cover is greater than a height of at least one electrode terminal of the two electrode terminals after electrical connection, such that a gap is provided between the at least one electrode terminal and the cover after the surface of the battery cell is fixed to the cover, and in an installed orientation of the battery within the vehicle, the cover is positioned above the accommodating chamber portion of the box and forms at least a portion of a floor panel of the vehicle.

* * * * *